United States Patent Office 3,792,078
Patented Feb. 12, 1974

3,792,078
CYCLODODECYLMETHYL CYCLODODECANE-
CARBOXYLATES
Jack Newcombe, Freehold, Anderson O. Dotson, Jr., New
Brunswick, and Jerome Robert Olechowski, Trenton,
N.J., assignors to Cities Service Company, New York,
N.Y.
No Drawing. Filed May 28, 1971, Ser. No. 148,142
Int. Cl. C07c 69/74
U.S. Cl. 260—468 R                   1 Claim

ABSTRACT OF THE DISCLOSURE

Cyclododecylmethyl cyclododecanecarboxylate is disclosed as a novel composition of matter which may be nitrosated with nitrosylsulfuric acid to laurinlactam. The lactam is converted by conventional methods into nylon 12.

Nylon 12 is becoming an increasingly important polymer composition for the manufacture of molded articles, fibers and the like. The present invention relates to a novel ester composition of matter which may be employed in the synthesis of laurinlactam which in turn is used in the manufacture of nylon 12. The present invention also relates to a method for manufacturing such ester compositions.

The present invention relates to a novel composition of matter comprising cyclododecylmethyl cyclododecanecarboxylate type esters. The esters of the present invention may be generally represented by the following formula:

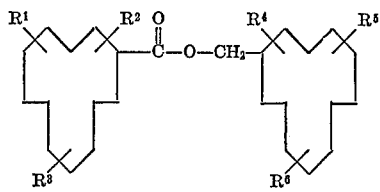

where $R^1$, $R^2$, $R^3$, $R^4$, $R^5$, and $R^6$ may be the same or different and are members of the group comprising hydrogen or the one to about three carbon atom alkyl radicals, especially

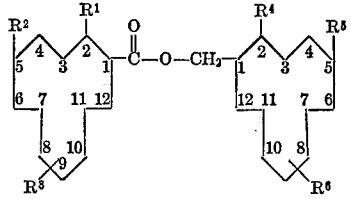

where $R^3$ and $R^6$ may be either in the 8 or 9 position.

The composition of Formula I also includes those compounds where $R^1$ and $R^4$ are in the 3 position, $R^2$ and $R^5$ are in the 6 position and $R^3$ and $R^6$ may be in the 9 or 10 position in one case or the 8 or 9 position in another case. Also included in Formula I are compounds where $R^1$ and $R^4$ are in the 2 position, $R^2$ and $R^5$ are in the 4 position and $R^3$ and $R^6$ may be in the 8 or 9 position in one case or in the 9 or 10 position in another case. The cyclododecyl rings of Formula I will contain the same substituents on the rings where a Tischenko reaction is used to make the ester from the aldehyde; however, the cyclododecyl rings do not have to be identically substituted and combinations of the foregoing specifically designated $R^1$, $R^2$ and $R^3$ position substituted cyclododecyl rings with the foregoing specifically designated $R^4$, $R^5$ and $R^6$ position substituted cyclododecyl rings in the ester may be used.

Compounds falling within this formula include cyclododecylmethyl cyclododecanecarboxylate as well as those compounds having the following structures:

(Ia) 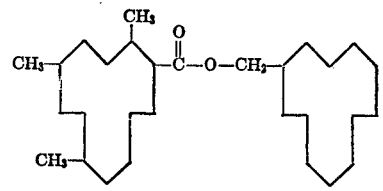

(Ib) 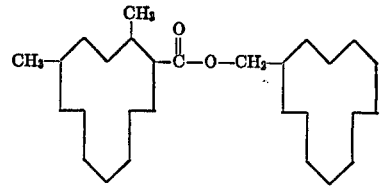

(Ic) 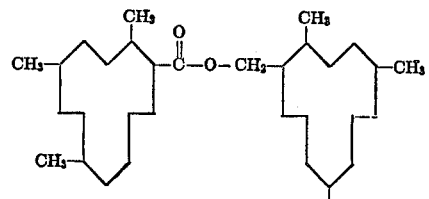

(Id) 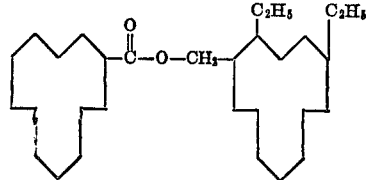

(Ie) 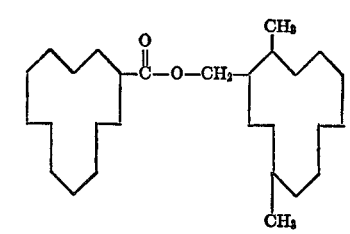

The novel ester compositions of the present invention are obtained by the esterification of cyclododecanecarboxylic acids with cyclododecylmethanol. Cyclododecane carboxylic acids are prepared by the oxo reaction of cyclododecene compounds with carbon monoxide and hydrogen to obtain cyclododecanecarboxaldehyde which in turn are converted into acids by an oxidation process. The oxidation process in its simplest form comprises letting the aldehydes stand exposed in a beaker for a sufficient period of time to enable them to undergo air oxidation and subsequent conversion into the acids.

Cyclododecylmethanols are prepared by the oxo addition of carbon monoxide and hydrogen to cyclododecenes in the presence of oxo catalysts such as dicobaltoctacarbonyl or hydrocobalt tetracarbonyl and are obtained in substantially the same manner as the aldehydes however different reaction conditions such as higher temperatures are employed in order to increase the production of alcohols. It is generally believed that the oxo addition of carbon monoxide and hydrogen to cyclic unsaturated hydrocarbons proceeds in the order of carboxaldehyde formation initially after which the carboxaldehyde is converted to the cyclic methanol derivative. The preparation of this alcohol is further described in U.S. Pat. 3,354,229.

In the production of the alcohol by the oxo process, it is believed that aldehyde is produced as one of the first reaction products and that the aldehydes are subsequently converted to alcohols by reduction because of the hydrogen that is present during the reaction. In the course of the reaction, the unsaturated position in the olefin will add both the carbon monoxide and the hydrogen. Hydrogen is taken up by the carbon atom of the olefinic moiety opposite the carbon atom where the carbon monoxide is added. Because the reaction is usually conducted in the presence of equimolar amounts of carbon monoxide and hydrogen wherein one mol of carbon monoxide and only one-half mol of hydrogen is taken up at each unsaturated position of the olefin, hydrogen, in excess of the stoichiometric amount required for the reaction, is present which tends to react with the aldehyde formed to produce the corresponding alcohol.

The esters are prepared from cyclododecanecarboxylic acids and cyclodecylmethanols with an esterification catalyst such toluenesulfonic acid, borontrifluoride etherate, sulfuric acid, hydrochloric acid or other equivalent esterification catalyst which are known in the art. In order to facilitate removal of the water of esterification solvents may also be employed in the esterification reaction such as benzene, carbon tetrachloride, heptane, and toluene and the art known equivalents thereof such as xylene, furan, alkyl substituted tetrahydrofurans wherein the alkyl substituent contains from one to about four carbon atoms, chloroform, fluorinated and halofluorinated alkanes containing up to about 5 carbon atoms, and the about five to about ten carbon atom aliphatic hydrocarbons and the isomers thereof. Various mixtures of these solvents may be employed such as the two component or three component mixtures, especially azeotropic combinations of the aforementioned solvents and/or their equivalents.

Another method for preparing the esters of the present invention comprises operating the previously described oxo reaction with the cyclododecenes under conditions to prepare an approximate equimolar mixture of cyclododecanecarboxaldehydes and cyclododecylmethanols. After isolation of the aldehydes and alcohols by distillation, a solvent such as benzene or toluene is added and the aldehyde portion of the distillate is oxidized with oxygen or air to produce an equimolar mixture of acids and alcohols. Low temperature oxidation conditions are utilized, from about −10 to about 50° C. so as to oxidize the cyclododecanecarboxaldehydes to cyclododecanecarboxylic acids without appreciable oxidation of the cyclododecylmethanols. Upon completion of the oxidation, an esterification catalyst is then added to the reaction mixture, the mixture heated to reflux and the water liberated is collected in a Dean-Stark trap to obtain the cyclododecylmethyl cyclododecanecarboxylates.

The catalyst and conditions suitable for conducting the oxo reaction according to this aspect of the invention may be any oxo catalyst known in the art or other oxo catalysts which may be known, especially the conventionally known and used catalysts. The suitable oxo reaction conditions are generally described along with the catalysts in Unit Processes in Organic Synthesis, Groggins, 4th edition, pp. 59–577; Encyclopedia of Chemical Technology, Kirk and Othmer, vol. 9, pp. 706–712; U.S. Pat. No. 3,184,432 (Wilke) 1965; British Pat. No. 1,132,666, July 1967 and High Oxo Alcohols, L. F. Hatch, Wiley, New York, 1957. Pressures, on the order of 70 to 350 atmospheres or from about 1000 to about 5000 p.s.i.g. and temperatures from 100 to 180° C. are used for carrying out the reaction.

The metal catalysts especially suitable for the oxo method of the present invention comprise those having a metal taken from Group VIII of the Periodic Table of Elements which includes iron, cobalt, nickel, ruthenium, rhodium, palladium, osmium, iridium, platinum, as well as the Group VII–B metals manganese and rhenium; the Group VIII and Group VII–B metals especially preferred being those taken from the third period (iron, cobalt, nickel and manganese). The most preferred metals are manganese and cobalt.

Catalysts of the formula $$Me_a(H)_b(L)_c$$

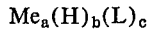

are preferred where "Me" is one of the foregoing Group VIII or Group VII–B metals especially the Group VIII metals and "L" is an isoelectronic ligand known in the oxo catalyst art and preferably comprises a carbonyl radical which may be designated CO. The value for "$a$," "$b$" or "$c$" will vary depending on the metal employed and the oxidation state of the metal. Where a Group VIII metal is used, the value for "$a$" will be one or two, "$b$" may be zero or one whereas the value for "$c$" will be from about four to about eight and $a+b+c$ will be about 10.

Preferred catalysts comprise dicobalt octacarbonyl;

$$Co_2[CO]_8$$

which may be obtained according to the process disclosed in U.S. Pat. No. 3,236,597 or hydrocobalt tetracarbonyl $$CoH[CO]_4$$

which may be obtained according to the method described in U.S. Pat. No. 2,767,048. It is believed that during the course of the oxo reaction, the dicobalt octacarbonyl if used as the starting catalyst is converted to the hydrocobalt tetracarbonyl species which is the active catalyst species for the reaction. Accordingly, the hydrocobalt tetracarbonyl is the most preferred of the two catalysts.

The weight ratio of catalyst to olefin according to the present invention may vary from about 100 to about 0.1 especially from about 20 to about 1.0 and especially from about 10 to about 2.0 gram atoms of catalyst metal per 1,000 gram mols of cyclic olefin starting material.

In conducting the oxo reaction according to the present invention the catalyst is dissolved in a solvent in order to improve the efficiency of the reaction. Any solvent may be employed in this regard which has been empirically observed to dissolve the catalyst in the concentrations employed in the reaction and which is also relatively nonvolatile at the reaction conditions so as to maintain the solvent in liquid form at the required concentration during the course of the reaction. Additionally, the solvent should be relatively inert or non-reactive under the reaction conditions and compatible with the reacted olefin. The solvents generally employed comprise the aromatic solvents, such as benzene, or the alkyl-substituted aromatic solvents, such as toluene and xylene and the various known isomers thereof. The solvent may be employed in any concentrations provided that there is at a minimum, sufficient solvent to dissolve the catalyst. The maximum amount of solvent used will be dictated by the economics of solvent recovery after conversion of olefin to aldehyde, solvent handling and other considerations based on commercial production.

The cyclic olefins which are employed in the oxo process to manufacture the cyclododecanecarboxaldehydes and cyclododecylmethanols used according to the present invention may be represented by the formula (II)

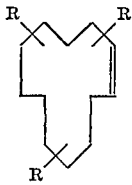

where R may be $R^1$, $R^2$, $R^3$, $R^4$, $R^5$, or $R^6$ which have been defined with regard to Formula I.

Compounds falling within Formula II are as follows:

(IIa) 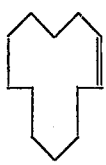

(IIb) 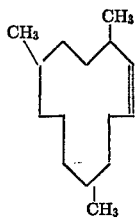

(IIc) 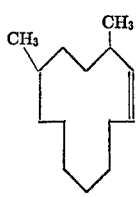

(IId) 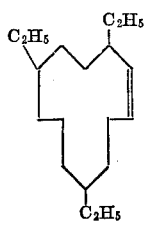

(IIe) 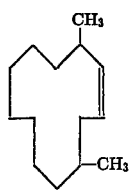   (IIf) 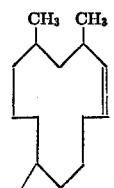

The use of these olefins in the esterification process thus comprises reacting the olefin of the formula

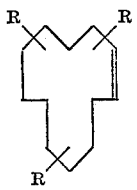

by an oxo reaction to obtain substantially equimolar amounts of

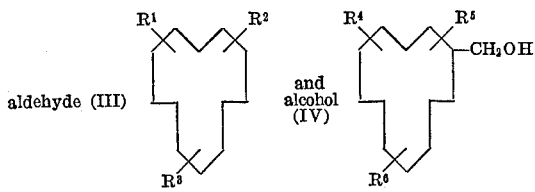

separating aldehyde (III) and alcohol (IV) from the by-products of said oxo reaction to obtain a first mixture of aldehyde (III) and alcohol (IV) and oxidizing said first mixture to obtain an acid in substantially stoichiometric amounts based on said aldehyde (III) and under conditions so as not to react said alcohol (IV), thereby obtaining a second mixture of

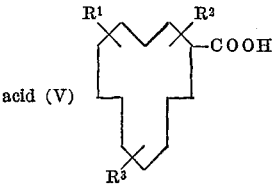

acid (V)

and said alcohol (IV) and esterifying said mixture in the presence of an esterification catalyst. The radicals R, $R^1$, $R^2$, $R^3$, $R^4$, $R^5$ and $R^6$ have all been defined previously with respect to Formulae I and II. The starting olefin (II) in this regard may be a mixture of olefins or a single olefin.

The pressure during the course of the oxo reaction may be altered or maintained by venting the reactor adding carbon monoxide and/or hydrogen or by a change in temperature. The ratio of carbon monoxide may also be altered, fluctuated or maintained by adding either one or by the take up of either one by the olefin during the course of the reaction. The carbon monoxide hydrogen ratios that are especially preferred are those from about 1:1 to about 3:1.

The amount of carbon monoxide employed in the reaction will vary from about 25% of the stoichiometric amount up to about 3 times the stoichiometric amount required to react one mole of carbon monoxide with each carbon to carbon double bond in the olefin.

The esterification and oxo processes of the invention may be carried out by either a batch, continuous or semi-continuous method wherein by definition a batch process is considered one in which all the product of the process is removed from the reactor prior to introducing any fresh reactants into the reactor.

A continuous process is one wherein material is continuously fed and continuously withdrawn from the reactor. The semi-continuous process comprises one where either the feed or product of the reaction is introduced or discharged separately from one another on an incremental basis.

Any mixtures of the olefins described herein may also be employed as the starting material according to the present invention, especially the 2, 3, 4 or 5 component mixtures. Furthermore, the starting olefin does not have to be a CP grade of material and purities of from about 50 to about 98 or 99% olefin may be employed.

It is preferred that the oxidation of the aldehyde and alcohol be carried out in the liquid phase which by definition shall mean either a solution, a suspension or dispersion of the reactants in a solvent such as the solvents described herein for nitrosation. The molar ratio of solvent to aldehyde preferably is about from 1 to about 100 parts of solvent per 1 part of aldehyde, preferably from 1 to about 50 parts of solvent per 1 part aldehyde the most preferred range being from about 5 to about 10 parts of solvent per 1 aldehyde. The reaction may be carried out at temperatures varying from −25° C. to about +75° C. preferably from about −15° C. to about +60° C. and the most preferred being from −10° C. to about +50° C.

The oxidation can be conducted commercially at from about 0 to about 25° C. Because of the expenses of refrigerating, temperatures below 0° C. are not ordinarily employed on a commercial basis. The ratio of oxygen to aldehyde and the time that the reaction is carried out is sufficient so that there is no further oxygen take up at the preferred conditions, although these conditions can be varied so that at a minimum they are adequate to convert aldehyde to acid. The oxygen (including ozone) may also be diluted with any inert gas such as nitrogen, or the so-called rare gases, healium, neon, argon, krypton, xenon, or gases which have been empirically observed not to enter into or adversely affect the oxidation of the aldehyde to the acid. The most common oxidizing gas used is air. The pressure of the reaction will vary from about 0.1 atmosphere to about 20 atmospheres, preferably from about 0.4 to about 15 atmospheres the most preferred range being from about 0.6 to about 5 atmospheres.

Normally the oxidation is run at atmospheric pressure by which it is intended to include variations due to changes in atmospheric pressure based on natural fluctuations due to location and other ordinary fluctuations in barometric pressure.

Another method of preparing the ester is to employ the Tischenko reaction which consists of reacting cyclododecanecarboxyaldehydes with an aluminum alkoxide such as aluminum ethoxide or aluminum isopropoxide. The Tischenko reaction is conducted in the same alcohol from which the alkoxide is derived; for example, ethyl alcohol would be used with aluminum ethoxide and isopropyl alcohol would be used with aluminum isopropoxide. The alcohols and the alkoxides of aluminum that may be employed in this respect contain from one to about eighteen carbon atoms and are preferably those containing from about one to about twelve carbon atoms; the most preferred are those containing from one to about eight carbon atoms. The Tischenko reaction involves the intramolecular oxidation-reduction of the cyclododecanecarboxaldehydes and the sole product produced is uyclododecylmethyl cyclododecanecarboxylates in high yields.

The cyclododecylmethyl cyclododecanecarboxylates of the present invention are nitrosated to the corresponding laurinlactams employing nitrosation catalysts reagents and conditions well known in the prior art.

The nitrosation catalyst especially preferred for the process of the present invention comprises those compounds or nitrosation agents generally described in U.S. Pat. 3,022,291 and may be generally characterized as the derivatives of nitrous acid such as nitrosyl sulfuric acid, nitrosyl sulfuric anhydride; nitrosyl halides such as the nitrosyl chlorides and nitrosyl bromides, alkali metal salts of nitrous acid such as sodium, potassium and ammonium nitrites, alkyl nitrites, nitrous anhydride and nitrogen monoxide. The nitrosation catalyst that is especially preferred comprises nitrosyl sulfuric acid which may be prepared, for example, by the reaction of (1) nitrogen trioxide ($N_2O_3$) with sulfur trioxide, (2) a nitrosyl halide especially nitrosyl chloride with sulfuric acid, (3) nitrite salts with sulfuric acid as well as other processes known in the art. The nitrosyl sulfuric acid may be dissolved in any concentration in oleum where the oleum may be defined as sulfuric acid containing from 1 to about 65% sulfur trioxide especially from about 5 to about 65% sulfur trioxide and preferably from about 50 to about 65% sulfur trioxide.

In order to minimize the production of sulfate salts in the manufacture of lactams from the carboxylates a nitrosation catalyst containing "low bound sulfate" is employed. The expression "low bound sulfate" is best understood in the context of the nitrosation reaction as follows:

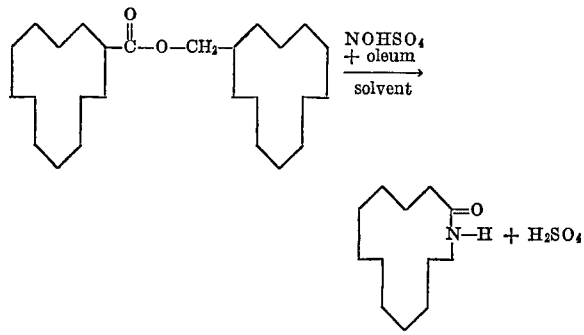

The nitrosyl sulfuric acid ($NOHSO_4$) and oleum in the above reaction comprise the nitrosating agent both of which contain a sulfate ion $SO_4^=$ which may be referred to as bound sulfate or bound $SO_3$. In addition, the oleum has unbound sulfur trioxide or $SO_3$ dissolved therein and accordingly there is a molar ratio between the bound sulfate ($SO_3$) and the unbound $SO_3$ in the nitrosating agent which will vary depending on what concentration of oleum is employed, e.g. 50% $SO_3$ in $H_2SO_4$ or 65% $SO_3$ in $H_2SO_4$. It has been discovered that the by-product of the above reaction, $H_2SO_4$ results from bound sulfate in the nitrosating agent and that this $H_2SO_4$ has to be removed by neutralization with $NH_4OH$. The amount of $H_2SO_4$ produced as a by-product is proportional to the amount of bound sulfate in the system, and consequently by reducing the amount of bound sulfate in relationship to the unbound $SO_3$ in the nitrosating agent, $H_2SO_4$ as a by-product is reduced and the amount of $NH_4OH$ required for neutralization is also reduced. A low bound sulfate nitrosating agent is therefore preferably employed which is obtained by using oleum with the highest practical amount of $SO_3$ that can be dissolved therein which is about 65% $SO_3$ in $H_2SO_4$.

Reduction of bound sulfate is further obtained by eliminating $H_2SO_4$ as the "solvent" in the above reaction and substituting an organic solvent in its place or any equivalent non-sulfuric acid type solvent.

Maintaining the sulfate ion in the reaction at the lowest possible level therefore minimizes the production of by-product sulfuric acid and employment of this system employing a minimum sulfate ion concentration is what is meant by the expression "low bound sulfate." The solvents in addition to chloroform which may be employed in the "low bound sulfate" system include the perfluoro and perchloro methanes and ethanes as well as aliphatic, cycloaliphatic and alkylcycloaliphatic hydrocarbons having from about 5 to about 15 carbon atoms and are selected so that a reflux can be maintained at the reaction temperatures. Solvents that reflux at atmospheric pressure at the reaction temperature are preferred. Examples of solvents suitable in this regard comprise pentane, hexane, heptane, isopentane, isohexane, isoheptane, octane, nonane, decane, undecane, cyclopentane, cyclohexane, methyl cyclohexane, ethyl cyclohexane, propyl cyclohexane, and the dialkyl cyclohexanes and trialkyl cyclohexanes having from about 1 to about 3 carbon atoms and the various isomers thereof. Any combination of the foregoing solvents may be employed especially the azeotropic combinations thereof or combinations having from 2 to about 4 components.

The mole ratio of the ester of the present invention to the moles of nitrogen in the nitrosating agent may vary from about 100:1 to about 1:100, especially from about 2:1 to about 1:2 and preferably from about 7:5 to about 5:7. The reaction is conducted for a period of time to obtain some conversion and preferably a high conversion of the ester to the lactam at high efficiencies where efficiency is the ratio of the amount of starting material converted to the yield of the lactam sought. The ester, nitrosating agent and solvent are combined by adding the nitrosating agent to the ester or vice versa at such a rate so as to maintain a vigorous reflux. Incremental addition of the reactant esters or nitrosating agent is required since the reaction is highly exothermic. It is preferred to add the ester to the nitrosating agent during the reaction and it is preferred not to contact unreacted ester needlessly with the sulfuric acid liberated during the reaction. The addition of nitrosating agent to the ester compound might be of some benefit if other compounds are to be made simultaneously with the lactam, and it is not intended that this method of addition be excluded.

The nitrosation reaction is conducted over a range of temperatures from about 10° centigrade up to about 150° centigrade, the upper limit being dependent upon the boiling point of the solvent used since the reaction is carried out under reflux conditions due to its highly exothermic nature. Ambient temperatures are the preferred lower limit of this range, ambient temperature being defined as outdoor temperature which will vary seasonably depending on location. The range of temperatures especially suitable comprises from about 20° centigrade to about 100° centigrade and preferably from 50° centigrade to about 80° centigrade. The pressure at which the reaction can be conducted will vary from atmospheric pressure up to about 10 atmospheres, especially from atmospheric pressure up to about 5 atmospheres, and preferably from atmospheric pressure up to about 1.5 atmospheres where atmospheric pressure may be defined to include variations in pressure due to changes in ambient pressure because of location and other fluctuations in barometric pressures that occur naturally.

Although the inventors do not wish to be limited by any theory, it is believed that in the nitrosation of the ester that both the cyclododecylmethoxy and the cyclododecylcarbonyl groups of the esters react with the nitrosation catalyst such as the nitrosylsulfuric acid for the production of the corresponding laurinlactams.

The following examples are illustrative.

EXAMPLE 1

Preparation of cyclododecylmethyl cyclododecanecarboxylate

Cyclododecanecarboxylic acid 10.4013 g. (0.0490 mole) and 8.8354 g. of cyclododecylmethanol (0.04455 mole) are weighed quantitatively into a 100 ml. flask equipped with a Dean Stark trap. After addition of 50 ml. of benzene and 0.5 g. of p-toluenesulfonic acid the reaction mixture is refluxed at atmospheric pressure and a pot temperature of 93° C., initially and at 85° C. when 0.78 ml. or essentially all of the water produced in the reaction is collected in the trap. The reaction is essentially complete at the end of 6.5 hours, but is continued for a total of 14 hours. The reaction mixture is cooled, extracted 4 times with 10 ml. portions of 0.1 N NaOH to extract the slight excess of cyclododecanecarboxylic acid, the raffinate washed 4 times with 10 ml. portions of water and dried over anhydrous $Na_2SO_4$. After stripping off the benzene, 16.2 g. of a light yellow oil is obtained, which slowly crystallizes to a white crystalline solid, M.P. 32–36° C. giving a 92.6 mole percent yield of ester based on the limiting reactant, cyclododecylmethanol. After recrystallization from a mixture of ethanol and hexane, the ester has a M.P. of 36–37° C. It has a faint pleasant spicy odor characteristic of that of methyl cyclododecanecarboxylate.

The structure of cyclododecylmethyl cyclododecanecarboxylate is confirmed by IR and NMR analysis. Molecular weights of 390.7 and 393.2 are found by vapor phase osmometry in benzene as compared to a theoretical 392.7.

EXAMPLE 2

Preparation of cyclododecylmethyl cyclododecanecarboxylate

Cyclododecylmethanol, 10.1689 g. (0.0512 mole) and cyclododecanecarboxylic acid, 11.0558 g. (0.0521 mole) are refluxed at atmospheric pressure in 50 ml. of benzene containing 0.5 g. of toluenesulfonic acid for 13 hours, in a 100 ml. flask equipped with a Dean Stark trap. A total of 0.90 ml. of water is recovered in the trap. The reaction mixture is extracted 5 times with 10 ml. portions of 0.1 N NaOH, the raffinate washed 5 times with 10 ml. portions of water, and dried over anhydrous $Na_2SO_4$. After benzene is stripped from the mixture, 18.85 g. of relatively pure cyclododecylmethyl cyclododecanecarboxylate, M.P. 33–36° C., is obtained giving a 93.8 mole percent yield, based on cyclododecylmethanol.

EXAMPLE 3

Preparation of cyclododecylmethyl cyclododecanecarboxylate

Cyclododecane carboxylic acid 21.23 g. (0.1 mole) and 200 ml. flask containing 100 ml. of toluene and 0.5 g. or borontrifluoride etherate. After fitting the flask with a reflux condenser and Dean Stark trap, the reaction mixture is heated at atmospheric pressure at the reflux temperature of toluene, 110° C., until all of the water of reaction, 1.8 ml., is collected in the Dean Stark trap. Eight hours is sufficient for completion of the reaction. The reaction mixture is washed 5 times with 25 ml. portions of 0.1 N NaOH, 5 times with 25 ml. portions of water, and dried over anhydrous $Na_2SO_4$. On stripping off the solvent, 38.41 g. of cyclododecylmethyl cyclododecanecarboxylate is obtained as a light yellow oil, which slowly crystallizes to a white crystalline solid, M.P. 44–36° C., 97.8 mole percent yield.

EXAMPLE 4

Nitrosation of cyclododecylmethyl cyclododecanecarboxylate

To a 125 ml. flask equipped with stirrer, heater, thermometer, and reflux condenser are added 11.75 g. (0.05 mole) 54% nitrosylsulfuric acid, 5.77 g. (0.058 mole) sulfuric acid and 20 gm. of 65% oleum. The mixture is brought to 120–130° C. and maintained at this temperature while stirring for one hour and is then cooled to 65° C. This mixture is referred to below as the nitrosating agent.

To a 250 ml. flask equipped with heater, stirrer, thermometer, reflux condenser and addition funnel are added 9.82 g. (0.025 mole) cyclododecylmethyl cyclododecanecarboxylate, and 11.75 g. (0.119 mole) of 100% sulfuric acid. The entire nitrosating agent is added dropwise to the mixture of cyclododecylmethyl cyclododecanecarboxylate and sulfuric acid at 65° C. over a period of 35 minutes. After addition of the nitrosating agent, the mixture is heated to 80–90° C. for one hour. At the end of reaction, the reaction mixture is poured over 184 gm. of ice.

After pouring the reaction mixture over ice, it is extracted with $CHCl_3$ (2× 250 ml.). The $CHCl_3$ extract is washed once with $H_2O$ and extracted with 2 N NaOH (2× 150 ml.). The $CHCl_3$ is evaporated to dryness to obtain 4.3 g. of crude laurinlactam product.

In addition to nitrosating the novel esters of the present invention in order to obtain the corresponding lactam these esters may also be converted to the corresponding acid such as cyclododecanecarboxylic acid by acid or base hydrolysis methods well known in the art and the acid subsequently converted to the lactam in accord with the nitrosation methods known in the prior art such as those described in U.S. Pats. 3,318,871 Metzger t al., May 9, 1967 and U.S. 3,022,291 Muench et al., Feb. 20, 1962. The ester of the present invention may also be employed as a chain stopping agent in polyesterification reactions such as those consisting essentially of equimolar amounts of maleic and phthalic acid and an equivalent amount of a diol such as ethylene glycol and/or propylene glycol. The novel esters of the present invention when added to the polyesterification reactants will hydrolyze to produce the corresponding monofunctional alcohol and monofunctional acid which in turn will act as chain stopping agents. The polyesters obtained in this regard may be cross-linked with styrene, or divinylbenzene and used in such applications as the manufacture of molded objects, especially fiber glass reinforced molded objects.

The various lactams produced according to the present invention, especially the laurinlactam is readily converted into nylon 12 by methods well known in the art.

When all the foregoing equivalent reaction conditions, olefins, catalysts and esters described are employed, the same general results are obtained as noted herein. Several of the equivalent conditions, catalysts, olefins and esters have been described broadly by reference to a range of temperatures, pressures and time; catalyst metals, ligands, carbon atoms contained in the olefins, aldehydes, carboxylic acids, alcohols and esters by which it is intended that such ranges are to include specific values between the upper and lower limits thereof as well as narrower ranges within the broad range disclosed. Thus, for example, where the temperature range is given broadly for the oxo reaction as within the limits of 120–180° C. any specific value, e.g. 151, 157.5, 120° C., etc. falling within this range is also intended as well as a narrower range within this broad range, e.g., 130–140° C. Furthermore, where the radicals $R^1$, $R^2$, and $R^3$ have been described as hydrogen or alkyl groups, any combination thereof can be used and compounds falling within and including the extremes where all radicals are hydrogen or all radicals are alkyl groups are also intended to be included in the formulae using such radicals. The various oxo catalysts broadly described as being suitable for the present invention can be used in any combination with the ligands noted.

Although the invention has been described by reference to one or more embodiments, it is not intended that the broad scope of the novel ester composition, ester nitrosation or oxo process be limited thereby, but that modifications are intended to be included within the broad spirit and broad scope of the foregoing disclosure and the following claims.

What is claimed is:
1. An ester corresponding to the formula:

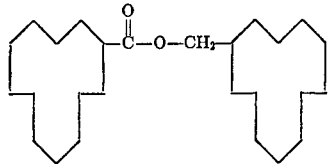

References Cited
UNITED STATES PATENTS
3,048,628   8/1962   Lynn et al. _____ 260—537

LORRAINE A. WEINBERGER, Primary Examiner

R. GERSTL, Assistant Examiner

U.S. Cl. X.R.
260—239.3 R